Oct. 14, 1969     G. DI ROSA     3,472,177

CONVEYOR WITH DRIVE RELEASE

Filed April 21, 1967

INVENTOR

GAETANO DI ROSA

BY

*Young + Thompson*

ATTORNEYS

United States Patent Office 3,472,177
Patented Oct. 14, 1969

3,472,177
CONVEYOR WITH DRIVE RELEASE
Gaetano Di Rosa, Pino Torinese, Italy, assignor to Soc.
F.A.T.A. S.R.L., Turin, Italy, an Italian company
Filed Apr. 21, 1967, Ser. No. 632,605
Claims priority, application Italy, Feb. 16, 1967,
50,568/67
Int. Cl. B61b 3/00; B65g 35/06
U.S. Cl. 104—172                           1 Claim

ABSTRACT OF THE DISCLOSURE

A trolley-type conveyor has carriages suspended from and rollable on opposed double tracks. Each carriage has a vertically swinging detent that swings upwardly and forwardly under the influence of gravity. A trolley-type pusher, carried by a superposed track, engages behind the detent to push the carriage forward. Each carriage at its rear has a cam that depresses the detent of a carriage approaching from the rear, thereby to disengage the pusher and stop the rear carriage.

---

The present invention relates to power-driven conveyors, more particularly of the type in which a plurality of conveyor members are movable relative to each other along tracks by being pushed from the rear.

It is an object of the present invention to provide such a conveyor, in which the approach of one conveyor member to another conveyor member from the rear disables the pusher with respect to the rear conveyor member, so that the advance of the conveyor members is halted one behind the other.

Another object of the present invention is the provision of such a conveyor which will be easy and inexpensive to manufacture and install, easy and reliable to operate, and rugged and durable in use.

Other objects and features of the present invention will become apparent from a consideration of the following description, taken in connection with the accompanying drawing, in which.

Figure 1:
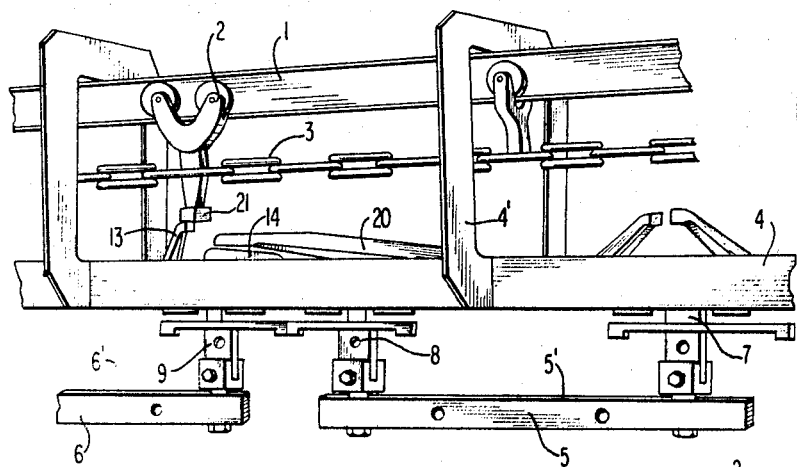
FIGURE 1 is a fragmentary perspective view of conveyor structure according to the present invention.

Referring now to the drawing in greater detail, there is shown a conveyor according to the present invention, comprising an upper track 1 in the form of a horizontal I-beam on whose lower flanges are rollingly supported the rollers of a trolley 2. Each trolley 2 has four such rollers, disposed two on the upper surface of each side of the lower flange of the track 1. There are a plurality of trolleys 2, interconnected by an endless chain 3 which circulates in a horizontal plane.

Track 1 is in unitary assembly with a pair of subjacent tracks 4 are supported from track 1 by means of hanger 4'. Each track 4 is in the form of a channel beam, the two tracks 4 opening toward each other in opposed relationship.

Carried between and depending from the tracks 4 are a plurality of trolley-type conveyor members in the form of carriages 5, 6. Although only two of these are shown in the drawing, it will of course be understood that any number can be used. Each carriage 5, 6 comprises a horizontal hanger or rack member 5', 6' that extends parallel to the tracks 4 and that is suspended at its opposite ends and is adapted to support articles or workpieces (not shown) that are to be conveyed. At its forward end, rack member is supported by a crab 7, and at its rear end by a hanger 8. Each crab 7 is in fact a trolley comprising a body portion 9 having a downwardly depending tongue 10 which is detachably secured to the forward end of rack member 5' or 6'. Each crab 7 is rollably supported on the lower flanges of the tracks 4 by means of a pair of rear rollers 11 and a pair of forward rollers 12. Centering rollers 11' and 12' are also carried by crabs 7 for rotation about vertical axes and roll along the inner edges of the lower flanges of tracks 4.

Figure 2:
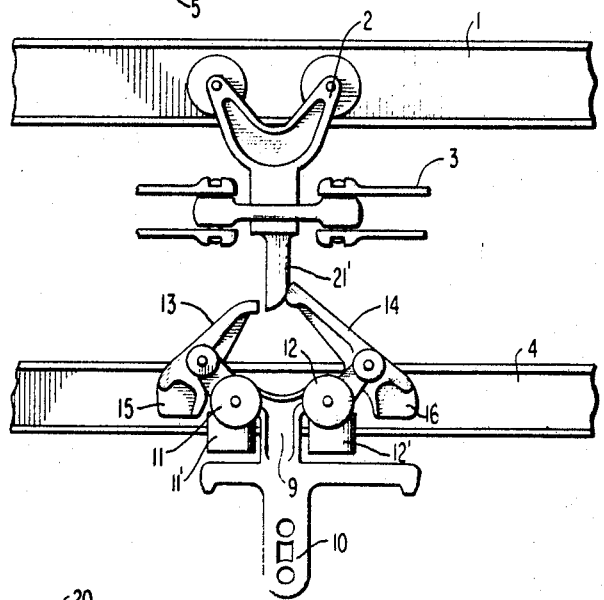
FIGURE 2 is a fragmentary enlarged side elevational view of the present invention.

Each crab 7 carries a pair of vertically swinging detents 13 and 14. Detent 13 is mounted for vertical swinging movement on body 9 about a horizontal axis intermediate its length. At its rear end, detent 13 has a weight 15 by which detent 13 is normally maintained in an outer or upwardly swung position as shown in FIG. 2. Detent 13 thus swings rearwardly upwardly from an inner or inoperative position to an outer or operative position as shown in FIG. 2. Detent 14, on the other hand, is similarly mounted for vertical swinging movement about a horizontal axis on body 9, but has a weight 16 at its forward end, so that detent 14 is swingable upwardly and forwardly from an inner or inoperative position to an outer or operative position as shown in FIG. 2. In their outer or upper positions as shown in FIG. 2, the detents 13 and 14 abut against body 9 to prevent further outward swinging movement.

Figure 3:
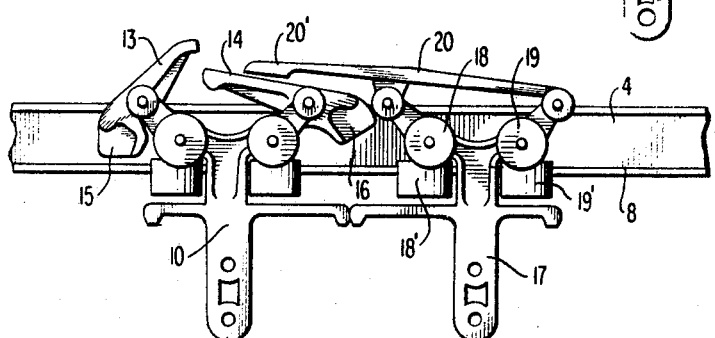
FIGURE 3 is a fragmentary side elevational view of the front and rear portions of two separate conveyor members, showing their interaction.

The hangers 8 at the rear ends of the carriages 5, 6 are detachably secured to the rack members 5', 6' by means of downwardly depending tongues 17, and are mounted for rolling movement on the lower flanges of tracks 4 by means of a pair of rear rollers 18 and a pair of forward rollers 19, and are guided laterally and centered by pairs of rollers 18' and 19' similar to 11' and 12'. But instead of any vertically swinging detents such as 13, 14, the rear hangers 8 are provided with a cam 20 that extends rearwardly a substantial distance beyond the rear of the associated carriage 5 or 6 and that has a rear spatular portion 20' whose under surface slidably engages the upper surface of detent 14 as shown in FIG. 3 to depress the detent 14 from the position of FIG. 2 to the position of FIG. 3.

Each trolley 2 has a downwardly depending pusher portion, which may have the shape shown at 21 in FIG. 1 or at 21' in FIG. 2. These pusher portions engage behind detents 14 to push the associated carriages forward.

In operation, the chain 3 is caused to circulate from left to right as shown in the drawing, by power means (not shown). With the detents 13, 14 of the crabs 7 in the position shown in FIG. 2, the pusher portion 21 or 21' will engage behind the detent 14 to push the carriage forward, that is, from left to right as shown in the drawing. But when a carriage approaches a forwardly positioned carriage, as carriage 6 is seen to approach carriage 5 in FIG. 1, then the cam 20 of the forward carriage 5 engages and depresses the detent 14 of the rear carriage 6, from the position shown in FIG. 2 to the position shown in FIGS. 1 and 3. Detent 14 thus is retracted below the pusher member of the trolley 2, so that the trolley 2 can proceed in a forward direction but the carriage 6 comes to rest behind and in contact with the carriage 5.

The relative positions of the parts are especially to be noted. As can be seen from a comparison of FIGS. 2 and 3, the pusher member 21', when moving from left to right relative to the detents 13 and 14, first depresses the detent 13 and then passes on to engage the detent 14 in pushing relationship. The detent 13 then swings back up to its FIG. 2 position. But when the cam 20 depresses detent 14, then the pusher member 21' rides free over the highest surface of cam 20, so that pusher member 21' never engages cam 20. The carriages then remain at rest in the position shown in FIG. 3, but they can be moved in the opposite direction by reversal of the direction of circulation of the chain 3 and trolleys 2. Upon reverse circulation, the pusher member 21 will ride over the cam 20 without touching it, but will contact the detent 13 and push the carriage 6 to the left out of contact with the carriage 5; or if it is the detent 13 of the carriage 5 that is engaged by the pusher member 21, then both of the carriages 5 and 6 will be pushed together to the left.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand.

Having described my invention, I claim:

1. A drive-disengaging trolley system comprising an upper track and a pair of subjacent tracks that are parallel to each other and to said upper track and disposed below said upper track, a first trolley rolling on said upper track and having a downwardly depending pusher member thereon, a drive line for pulling said first trolley and said pusher member along said upper track, a plurality of second trolleys rolling on and between said subjacent tracks each said second trolley having a crab thereon comprising a pair of vertically swinging detents one of which is vertically swingable in one direction and the other of which is vertically swingable in the opposite direction, said pusher member being adapted to extend between and be retained between the upper ends of said detents and to push said other detent forwardly to advance said second trolleys, a plurality of third trolleys rolling on and between said subjacent tracks and disposed in alternate relation with said second trolleys, a rearwardly extending member on each said third trolley whereby when said second trolleys are pushed forward by said pusher member until they arrive from behind at said third trolleys, said rearwardly extending member engages and pushes to an inoperative lower position said other detent of the rear second trolley thereby halting the advance of the rear second trolley, a hanger depending from each of said second and third trolleys, and article-supporting members extending between and connected at their ends to the lower ends of a pair of adjacent second and third trolleys with the second trolley at the front end and the third trolley at the rear end of the article-cupporting member, said rearwardly-extending member engaging said other detent above said subjacent tracks in said lower position of said other detent.

References Cited

UNITED STATES PATENTS

| | | | |
|---|---|---|---|
| 699,023 | 4/1962 | Schenk | 104—172 |
| 3,044,416 | 7/1962 | Reibel | 104—178 |
| 3,195,474 | 7/1965 | Dehne | 104—172 |
| 3,196,805 | 7/1965 | Bishop | 104—178 |
| 3,314,378 | 4/1967 | Potter | 104—172 |
| 3,348,496 | 10/1967 | Klamp | 104—172 |
| 3,363,499 | 11/1967 | Sutherland | 104—178 |
| 3,357,369 | 12/1967 | Dehne | 104—172 |

ARTHUR L. LA POINT, Primary Examiner

DANIEL F. WORTH III, Assistant Examiner